US009497471B2

(12) United States Patent
Demos

(10) Patent No.: US 9,497,471 B2
(45) Date of Patent: *Nov. 15, 2016

(54) METHOD AND SYSTEM FOR IMPROVING COMPRESSED IMAGE CHROMA INFORMATION

(75) Inventor: Gary A. Demos, Culver City, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 1513 days.

This patent is subject to a terminal disclaimer.

(21) Appl. No.: 12/913,045

(22) Filed: Oct. 27, 2010

(65) Prior Publication Data

US 2011/0038411 A1 Feb. 17, 2011

Related U.S. Application Data

(62) Division of application No. 12/176,267, filed on Jul. 18, 2008, which is a division of application No. 09/905,039, filed on Jul. 12, 2001, now abandoned.

(51) Int. Cl.
*H04N 7/12* (2006.01)
*H04N 19/186* (2014.01)
*H04N 19/124* (2014.01)
*H04N 19/167* (2014.01)
(Continued)

(52) U.S. Cl.
CPC ............ *H04N 19/186* (2014.11); *G06T 3/4015* (2013.01); *G06T 9/007* (2013.01); *H04N 7/12* (2013.01); *H04N 19/124* (2014.11); *H04N 19/126* (2014.11); *H04N 19/167* (2014.11); *H04N 19/176* (2014.11); *H04N 19/61* (2014.11)

(58) Field of Classification Search
CPC .............................................. H04N 19/00315

USPC ............ 375/240.01, 240.04, 240.12, 240.25, 375/240.26
IPC ......................................................... H04N 7/12
See application file for complete search history.

(56) References Cited

U.S. PATENT DOCUMENTS 4,654,696 A 3/1987 Dayton et al.
4,903,317 A 2/1990 Nishihara et al.
(Continued)

FOREIGN PATENT DOCUMENTS

CA 2127151 A1 3/1995
DE 19714886 A 11/1997
(Continued)

OTHER PUBLICATIONS

EPO Office Action for Application No. 10 007 124.0-2223 dated Nov. 30, 2011, 4 pages.
(Continued)

*Primary Examiner* — Young Lee
(74) *Attorney, Agent, or Firm* — Fish & Richardson P.C.

(57) ABSTRACT

Methods, systems, and computer programs for improving compressed image chroma information. In one aspect of the invention, a resolution for a red color component of a color video image is used that is higher than the resolution for a blue color component of the color video image. Another aspect includes utilizing a lower or higher value of a quantization parameter (QP) for one or more chroma channels as compared to the luminance channel. Another aspect is use of a logarithmic representation of a video image to benefit image coding. Another aspect uses more than two chroma channels to represent a video image.

7 Claims, 4 Drawing Sheets

(51) Int. Cl.
  *H04N 19/176* (2014.01)
  *G06T 3/40* (2006.01)
  *G06T 9/00* (2006.01)
  *H04N 19/61* (2014.01)
  *H04N 19/126* (2014.01)

(56) References Cited

U.S. PATENT DOCUMENTS

| | | |
|---|---|---|
| 5,073,820 A | 12/1991 | Nakagawa et al. |
| 5,132,783 A | 7/1992 | Hieda |
| 5,189,530 A | 2/1993 | Fujii |
| 5,231,484 A | 7/1993 | Gonzales et al. |
| 5,294,974 A | 3/1994 | Naimpally et al. |
| 5,333,212 A | 7/1994 | Ligtenberg |
| 5,374,958 A | 12/1994 | Yanagihara |
| 5,408,270 A | 4/1995 | Lim |
| 5,426,463 A | 6/1995 | Reininger et al. |
| 5,438,374 A | 8/1995 | Yan |
| 5,440,344 A | 8/1995 | Asamura et al. |
| 5,442,407 A | 8/1995 | Iu |
| 5,446,498 A | 8/1995 | Boon |
| 5,465,119 A | 11/1995 | Demos |
| 5,475,435 A | 12/1995 | Yonemitsu et al. |
| 5,489,944 A | 2/1996 | Jo |
| 5,555,030 A | 9/1996 | Takamoto et al. |
| 5,661,524 A | 8/1997 | Murdock et al. |
| 5,668,600 A | 9/1997 | Lee |
| 5,737,032 A | 4/1998 | Stenzel et al. |
| 5,742,343 A | 4/1998 | Haskell et al. |
| 5,748,903 A | 5/1998 | Agarwal |
| 5,812,194 A | 9/1998 | Wilkinson |
| 5,825,421 A | 10/1998 | Tan |
| 5,825,680 A | 10/1998 | Wheeler et al. |
| 5,835,498 A | 11/1998 | Kim et al. |
| 5,852,565 A | 12/1998 | Demos |
| 5,877,754 A | 3/1999 | Keith et al. |
| 5,920,353 A | 7/1999 | Diaz et al. |
| 5,930,386 A | 7/1999 | Saito |
| 5,933,360 A | 8/1999 | Larson |
| 5,988,863 A | 11/1999 | Demos |
| 6,031,937 A | 2/2000 | Graffagnino |
| 6,069,914 A | 5/2000 | Cox |
| 6,115,421 A | 9/2000 | Katta et al. |
| 6,163,574 A | 12/2000 | Yagasaki |
| 6,172,768 B1 | 1/2001 | Yamada et al. |
| 6,215,824 B1 | 4/2001 | Assuncao |
| 6,236,727 B1 | 5/2001 | Ciacelli et al. |
| 6,268,886 B1 | 7/2001 | Choi |
| 6,301,304 B1 | 10/2001 | Jing et al. |
| 6,327,602 B1 | 12/2001 | Kim |
| 6,332,194 B1 | 12/2001 | Bloom et al. |
| 6,430,222 B1 | 8/2002 | Okada |
| 6,434,196 B1 | 8/2002 | Sethuraman et al. |
| 6,442,203 B1 | 8/2002 | Demos |
| 6,507,615 B1 | 1/2003 | Tsujii et al. |
| 6,535,251 B1 | 3/2003 | Ribas-Corbera |
| 6,629,104 B1 | 9/2003 | Parulski et al. |
| 6,650,708 B1 | 11/2003 | Ohgose |
| 6,654,417 B1 | 11/2003 | Hui |
| 6,654,420 B1 | 11/2003 | Snook |
| 6,728,317 B1 | 4/2004 | Demos |
| 6,816,552 B2 | 11/2004 | Demos |
| 6,957,350 B1 | 10/2005 | Demos |
| 7,113,152 B2 | 9/2006 | Ben-David et al. |
| 7,961,784 B2 | 6/2011 | Demos |
| 2001/0028725 A1 | 10/2001 | Nakagawa et al. |
| 2002/0154693 A1 | 10/2002 | Demos et al. |
| 2002/0186766 A1 | 12/2002 | Adelaide |
| 2003/0112863 A1 | 6/2003 | Demos |
| 2003/0112871 A1 | 6/2003 | Demos |
| 2003/0112873 A1 | 6/2003 | Demos |
| 2004/0005004 A1 | 1/2004 | Demos |
| 2005/0254649 A1 | 11/2005 | Demos |
| 2006/0002467 A1 | 1/2006 | Haskell et al. |
| 2011/0286517 A1 | 11/2011 | Demos |
| 2011/0286518 A1 | 11/2011 | Demos |
| 2011/0286519 A1 | 11/2011 | Demos |
| 2012/0033729 A1 | 2/2012 | Demos |
| 2012/0087408 A1 | 4/2012 | Demos |
| 2012/0087409 A1 | 4/2012 | Demos |

FOREIGN PATENT DOCUMENTS

| | | |
|---|---|---|
| EP | 511778 A3 | 11/1992 |
| EP | 531041 A1 | 3/1993 |
| EP | 534350 A2 | 3/1993 |
| EP | 0595562 B1 | 5/1994 |
| EP | 634871 A2 | 1/1995 |
| EP | 1369820 A2 | 12/2003 |
| GB | 2266635 A | 11/1993 |
| JP | 62264784 A | 11/1987 |
| JP | 62283776 A | 12/1987 |
| JP | 03092888 A | 4/1991 |
| JP | 04311195 A | 11/1992 |
| JP | 04323960 A | 11/1992 |
| JP | 6165150 A | 6/1994 |
| JP | 6350995 A | 12/1994 |
| JP | 7170516 A | 7/1995 |
| JP | 10004497 A | 1/1998 |
| JP | 11-18089 A | 1/1999 |
| JP | 1188879 A | 3/1999 |
| JP | 11239351 A | 8/1999 |
| JP | 2001008209 A | 1/2001 |
| JP | 2001045476 A | 2/2001 |
| JP | 2001086356 A | 3/2001 |
| JP | 2001177731 A | 6/2001 |
| JP | 2001252088 A | 9/2001 |
| WO | WO9504433 A1 | 2/1995 |
| WO | WO9535628 A1 | 12/1995 |
| WO | WO9728507 A1 | 8/1997 |
| WO | WO9827736 A2 | 6/1998 |
| WO | WO9836573 A1 | 8/1998 |
| WO | WO9920040 A1 | 4/1999 |
| WO | WO03007119 A2 | 1/2003 |
| WO | WO2004004310 A2 | 1/2004 |
| WO | WO03041041 A3 | 3/2005 |

OTHER PUBLICATIONS

Japanese Office Action and translation for Application No. 2008-206699 dated May 17, 2011, 5 pages.
Japanese Notification of Reason(s) for Refusal and translation for Application No. 2008-206699 dated Dec. 27, 2011, 4 pages.
U.S. Non-Final Office Action for U.S. Appl. No. 13/272,316 dated Jan. 10, 2012, 28 pages.
ISO/IEC JTC 1, "Coding of audio-visual objects—Part 2: Visual," ISO/IEC 14496-2 (MPEG-4 Part 2), Dec. 1999, 348 pages.
Bjontegaard et al., "Definition of New Coding Elements from Telenor," 10. VCEG Meeting; May 16, 2000-May 19, 2000; Osaka, JP; (Video Codingexperts Group of ITU-T SG.16), No. q15j28, May 9, 2000, EP030003057, ISSN: 0000-0466.
Communication Pursuant to Article 94(3) EPC issued in EP 12161246.9-2223 on Oct. 9, 2012, 8 pages.
Communication Pursuant to Article 94(3) EPC issued in EP 12160436.7-2223 on Nov. 9, 2012, 8 pages.
Communication Pursuant to Article 94(3) EPC issued in EP 12161251.9-2223 on Oct. 9, 2012, 8 pages.
Communication Pursuant to Article 94(3) EPC issued in EP 12161254.3-2223 on Nov. 20, 2012, 8 pages.
Communication Pursuant to Article 94(3) EPC issued in EP 12161238.6-2223 on Nov. 16, 2012, 8 pages.
Communication Pursuant to Article 94(3) EPC issued in EP 12161242.8-2223 on Nov. 16, 2012, 8 pages.
European Search Report issued in 12161246.9-2223 dated Aug. 1, 2012, 6 pages.
European Search Report issued in 12161251.9-2223 dated Aug. 1, 2012, 6 pages.
European Search Report issued in 12161254.3-2223 dated Jul. 30, 2012, 6 pages.

(56) References Cited

OTHER PUBLICATIONS

European Search Report issued in 12160431.8-2223 on Jul. 27, 2012, 6 pages.
European Search Report issued in 12160433.4-2223 on Jul. 27, 2012, 6 pages.
European Search Report issued in 12160436.7-2223 on Aug. 1, 2012, 6 pages.
European Search Report issued in 12160438.3-2223 on Aug. 1, 2012, 6 pages.
European Search Report issued in 12161242.8-2223 on Jul. 30, 2012, 6 pages.
European Search Report issued in 12161238.6-2223 on Jul. 30, 2012, 6 pages.
Japanese Office Action and translation, Application No. 2008-20669, dated Jul. 17, 2012, 4 pages.
Rijske, K. et al., "Report of General Video Ad Hoc Committee," 11.LBC Meeting; Oct. 17, 1995-Oct. 20, 1995; Darmstadt; (ITU Low Bitratecoding Group), No. LBC-95-251, Oct. 17, 1995.
Australian Examination Report, Application Serial No. 2002316676 dated Oct. 4, 2006, 1 page.
Australian Notice of Acceptance of Application, Application Serial No. 2002316676 dated May 9, 2007, 16 pages.
Australian Deed of Letters Patent and the published specification for the granted patent for Australian Patent No. 200703288; Granted Mar. 13, 2008, 47 pages.
Australian Examination Report, Application Serial No. 2007231887 dated Sep. 17, 2008, 2 pages.
Australian Notice of Acceptance of Application, Application Serial No. 2007231887 dated Oct. 2, 2008, 12 pages.
Australian Deed of Letters Patent and the published specification for the granted patent for Australian Patent No. 2007231887; Granted Jan. 29, 2009, 44 pages.
Canadian Office Action issued in 2452506 on Apr. 19, 2006, 3 pages.
Chinese Office Action issued in 02813792.2 on Mar. 11, 2005, 11 pages.
European Search Report (Partial) issued in 08075656.2 on Dec. 10, 2009, 4 pages.
Indian Office Action issued in 00056/DELNP/2004 on Apr. 8, 2011, 2 pages.
Mexican Patent No. 277175 issued on Jul. 9, 2010, 41 pages.
Notice of Allowance issued in U.S. Appl. No. 12/176,267 on Apr. 29, 2011, 7 pages.
Office Action issued in U.S. Appl. No. 09/905,035 on May 23, 2003, 5 pages.
Office Action issued in U.S. Appl. No. 12/176,267 on Dec. 10, 2010, 9 pages.
Office Action issued in U.S. Appl. No. 12/176,267 on Feb. 13, 2011, 7 pages.
PCT International Search Report issued in PCT/US02/22205 on Jan. 28, 2003, 7 pages.
PCT Written Opinion issued in PCT/US02/22205 on Apr. 2, 2003, 7 pages.
PCT International Preliminary Examination Report issued in PCT/US02/22205 on Mar. 2, 2004, 7 pages.
Singapore Office Action issued in 200301486-4 on May 22, 2008, 6 pages.
EPO Office Action for Application No. 10 007 124.0-2223 dated Aug. 18, 2011, 4 pages.
Bjontengaard, Gisele et al., "Use of Higher QP for Chroma AC Coefficients," 11. VCEG Meeting; Aug. 22, 2000-Aug. 25, 2000; Portland, Oregon, US;(Video Coding Experts Group of ITU-T SG.16), No. g15k29, Aug. 16, 2000 (Aug. 16, 2000), XP030003122, ISSN: 0000-0463, 2 pages.
EPO Office Action for Application No. 12160431.8 dated Aug. 21, 2012, 8 pages.
Australian Examination Report, Application Serial No. 2007203288, dated Aug. 27, 2007, 4 pages.
Australian Examination Report, Application Serial No. 2007203288, dated Sep. 20, 2007, 2 pages.
Australian Notice of Acceptance, Application Serial No. 2007203288, dated Nov. 21, 2007, 16 pages.
Canadian Office Action, Application Serial No. 2439727, dated Aug. 15, 2007, 3 pages.
Canadian Patent Grant, Canadian Application No. 2.452,506, dated Apr. 8, 2008, 3 pages.
Chinese Patent Publication; Patent No. ZL 02813792.2, dated Apr. 5, 2006, 25 pages.
Deed of Letters Patent and the published specification for the granted patent for Australian Patent No. AU 20022316676 B2; Granted Sep. 6, 2007, 41 pages.
European Search Report, Application Serial No. 02747000.4, dated May 13, 2008, 6 pages.
Japanese Office Action, Application Serial No. 2003-512824, dated Mar. 18, 2008, 46 pages.
Office Action, U.S. Appl. No. 09/798,346, dated Aug. 23, 2007, 8 pages.
Office Action, U.S. Appl. No. 09/798,346, dated Nov. 27, 2006, 7 pages.
Office Action, U.S. Appl. No. 09/798,346, dated Apr. 3, 2006, 12 pages.
Singapore Office Action, Application Serial No. 200601486-4, dated Sep. 7, 2007, 7 pages.
Singapore Office Action, Application Serial No. 200601486-4, dated Aug. 28, 2006, 12 pages.
Aravind, R. et al., "Packet Loss Resilience of MPEG-2 Scalable Video Coding Algorithms," IEEE Transactions on Circuits and Systems for Video Technology 6(5): 426-435 (Oct. 1996).
Bloomfield, L., "Copy Protection—déjà vu," Broadcast Engineering 40(11): 14-15 (Oct. 1998).
"Color Science: Concepts and Methods, Quantitative Data and Formulae," Wyszecki and Stiles, John Wiley and Sons, 2nd Edition, p. 485-489 (1982).
Demos, G., A Comparison of Hierarchical High Definition Imagry Coding Schema,: DemoGraFX Corp. IEEE, pp. 68-75 (1992).
Demos, G., "An Example Representation for Image Color and Dynamic Range Which is Scalable, Interoperable, and Extensible," 135th Technical Conference, Society of Motion Picture and Televison Engineers, Oct. 1993, Los Angeles, CA, 22 pages.
Demos, G., "Temporal and Resolution Layering in Advanced Television," SPIE 2663: 52-68 (Nov. 1995).
Demos, G., "The Use of Logarithmic and Density Units for Pixels," SMPTE Journal 100(10): Oct. 1990, pp. 805-816 (1990).
English language abstract for JP 06165150, published Jun. 10, 1994, entitled: "Dynamic Picture Coding/Decoding Device".
H.261, ITU-T Telecommunication Standardization Sector of ITU, Line Transmission of non-telephone signals. Video Codec for Audiovisual Services at p X64 kbits, (Mar. 1993), 32 pages.
H.263, Appendix III, ITU-T Telecommunication Standardization Sector of ITU, Series H: Audiovisual and Multimedia Systems, Infrastructure of audiovisual services—coding of moving video. Video coding for low bit rate communication, Appendix III: Examples for H.263 encoder/decoder implementations, (Jun. 2001), 48 pages.
H.263, ITU-T Telecommunication Standardization Sector of ITU, Series H: Audiovisual and Multimedia Systems, Infrastructure of audiovisual services—coding of moving video. Video coding for low bit rate communication, (Jan. 2005), 226 pages.
"IEEE Standard Specification for the Implementations of 8x8 Inverse Discrete Cosine Transforms," IEEE Std 1180-1990, The Institute of Electrical and Electronics Engineers, Inc.; United States of America, 13 pages (1991).
ISO/IEC 14496-2 International Standard, Information technology—coding of audio-visual objects—Part 2: visual, 2nd Edition, Dec. 1, 2001, 536 pages.
ISO/IEC 14496-2 International Standard, Information technology—coding of audio-visual objects—Part 2: visual, 2nd Edition, Amendment 2: Streaming video profile, Feb. 1, 2002, 64 pages.
Lim, Jae S., "A migration path to a better digital television system," SMPTE Journal 103(1): 2-6 (Jan. 1, 1994).
Notice of Allowance, Canadian Patent Application Serial No. 2452506, dated Dec. 6, 2007, 2 pages.

(56) References Cited

OTHER PUBLICATIONS

Patent Abstracts of Japan vol. 1999, No. 13 (Nov. 30, 1999) re: JP 11239351.
Patent Abstracts of Japan, vol. 1995, No. 03 (Apr. 28, 2005) re: JP 06350995.
Pinkerton, Janet, "Digital video stymied by content protection," Dealscope Consumer Electronics Marketplace, Philadelphia, Jan. 1999, vol. 4, issue 1, p. 32.
Puri et al., "Temporal Resolution Scalable Video Coding," Image Processing. 1994 International Conference, IEEE, pp. 947-951 (1994).
Vincent, A., et al., "Spatial Prediction in Scalable Video Coding," International Broadcasting Convention, IEEE Conference Publication No. 413, RAI International Congress and Exhibition Centre, Amsterdam, The Netherlands, Sep. 14-18, 1995, pp. 244-249.
Japanese Office Action with translation, Application No. 2003-512824, dated Oct. 15, 2008, 4 pages.
Office Action issued on Jan. 20, 2009, in corresponding Korean Patent Application No. 10-2004-7000367, and English translation (8 pages).
Office Action issued on Apr. 21, 2009 in corresponding Canadian Patent Application No. 2,621,107, 3 pages.
Canadian Office Action issued in 2,631,107 on Nov. 3, 2009, 3 pages.
Search and Examination Report issued on Dec. 2, 2009 in Singapore Patent Application No. 200805819-0.
European Search Report issued on Mar. 8, 2010, in EP 08075656.2, 7 pages.
European Search Report and Opinion issued on Sep. 1, 2010 in EP 10007124.0, 4 pages.
U.S. Non-Final Office Action for U.S. Appl. No. 13/325,695 dated Feb. 27, 2012, 36 pages.
U.S. Non-Final Office Action for U.S. Appl. No. 13/272,316 dated Mar. 29, 2012, 15 pages.
U.S. Non-Final Office Action for U.S. Appl. No. 13/325,773 dated Apr. 13, 2012, 38 pages.
U.S. Final Office Action for U.S. Appl. No. 13/325,695 dated Apr. 17, 2012, 5 pages.
U.S. Final Office Action for U.S. Appl. No. 12/272,316 dated May 7, 2012, 6 pages.
Office Action issued in U.S. Appl. No. 09/905,039 on Jul. 17, 2003, 9 pages.
Office Action issued in U.S. Appl. No. 09/905,039 on Jan. 15, 2004, 6 pages.
Office Action issued in U.S. Appl. No. 09/905,039 on Apr. 5, 2004, 7 pages.
Office Action issued in U.S. Appl. No. 09/905,039 on Sep. 2, 2004, 5 pages.
Office Action issued in U.S. Appl. No. 09/905,039 on Dec. 23, 2004, 7 pages.
Office Action issued in U.S. Appl. No. 09/905,039 on Apr. 8, 2005, 8 pages.
Office Action issued in U.S. Appl. No. 09/905,039 on Feb. 16, 2006, 6 pages.
Office Action issued in U.S. Appl. No. 09/905,039 on Aug. 8, 2007, 11 pages.
Office Action issued in U.S. Appl. No. 09/905,039 on Apr. 23, 2008, 10 pages.
Office Action issued in U.S. Appl. No. 12/176,267 on Aug. 24, 2009, 14 pages.
Office Action issued in U.S. Appl. No. 12/176,267 on Feb. 2, 2010, 7 pages.
Office Action issued in U.S. Appl. No. 12/176,267 on May 19, 2010, 10 pages.
Office Action issued in U.S. Appl. No. 12/176,267 on Sep. 27, 2010, 10 pages.
Communication Pursuant to Article 94(3) EPC issued in EP 12160438.3-2223 on Oct. 9, 2012, 8 pages.
U.S. Final Office Action for U.S. Appl. No. 13/325,773 dated May 15, 2012, 7 pages.
Office Action; Feb. 27, 2013; Japan; 2010-269367; 6 pages.
Search and Examination Report; Feb. 27, 2013; Singapore; 201203639-8; 18 pages.
EPO "Summons to attend oral proceedings pursuant to Rule 115(1) EPC" for European Application No. 12160431.8 dated May 17, 2013, 88 pages.
EPO "Summons to attend oral proceedings pursuant to Rule 115(1) EPC" for European Application No. 12160433.4 dated May 17, 2013, 88 pages.
EPO "Summons to attend oral proceedings pursuant to Rule 115(1) EPC" for European Application No. 12160436.7 dated May 17, 2013, 87 pages.
EPO "Summons to attend oral proceedings pursuant to Rule 115(1) EPC" for European Application No. 12160438.3 dated May 17, 2013, 87 pages.
EPO "Summons to attend oral proceedings pursuant to Rule 115(1) EPC" for European Application No. 12161238.6 dated May 17, 2013, 88 pages.
EPO "Summons to attend oral proceedings pursuant to Rule 115(1) EPC" for European Application No. 12161242.8 dated May 17, 2013, 87 pages.
EPO "Summons to attend oral proceedings pursuant to Rule 115(1) EPC" for European Application No. 12161246.9 dated May 17, 2013, 87 pages.
EPO "Summons to attend oral proceedings pursuant to Rule 115(1) EPC" for European Application No. 12161251.9 dated May 17, 2013, 87 pages.
EPO "Summons to attend oral proceedings pursuant to Rule 115(1) EPC" for European Application No. 12161254.3 dated May 17, 2013, 88 pages.
Bjontegaard et al., "H.26L Test Model Long Term No. 4 (TML-4) draft)", ITU-IT Study Group 16, Video Coding Experts Group Question 15, SCEG Meeting, May 16-18, 2000, Osaka, Japan, q15j72d).doc Jun. 16, 2000, Section 3.1, Section 4.3.3, Retrieved from the Internet <URL: http://wftp3.itu.int/av-arch/video-site/0005_Osa/q15j72d0.doc>, 30 pages.
Minutes of the oral proceedings in EP Application No. 12160431.8, dated Feb. 10, 2014, 7 pages.
Minutes of the oral proceedings in EP Application No. 12160433.4, dated Feb. 10, 2014, 8 pages.
Minutes of the oral proceedings in EP Application No. 12160436.7, dated Feb. 7, 2014, 5 pages.
Minutes of the oral proceedings in EP Application No. 12160438.3, dated Feb. 10, 2014, 6 pages.
Minutes of the oral proceedings in EP Application No. 12161238.6, dated Feb. 7, 2014, 6 pages.
Minutes of the oral proceedings in EP Application No. 12161242.8, dated Feb. 10, 2014, 10 pages.
Minutes of the oral proceedings in EP Application No. 12161246.9, dated Feb. 10, 2014, 5 pages.
Minutes of the oral proceedings in European Application No. 12161251.9, dated Feb. 10, 2014, 5 pages.
Minutes of the oral proceedings in European Application No. 12161254.3, dated Feb. 7, 2014, 5 pages.
Office Action in European Application No. 12160431.8 dated Feb 10, 2014, 17 pages.
Office Action in European Application No. 12160433.4 dated Feb. 10, 2014, 16 pages.
Office Action in European Application No. 12160436.7 dated Feb. 7, 2014, 15 pages.
Office Action in European Application No. 12160438.3, dated Feb. 10, 2014, 16 pages.
Office Action in European Application No. 12161238.6, dated Feb. 7, 2014, 17 pages.
Office Action in European Application No. 12161242.8, dated Feb. 10, 2014, 17 pages.
Office Action in European Application No. 12161246.9, dated Feb. 12, 2014, 15 pages.

(56) References Cited

OTHER PUBLICATIONS

Office Action in European Application No. 12161251.9, dated Feb. 10, 2014, 16 pages.
Office Action in European Application No. 12161254.3, dated Feb. 7, 2014, 15 pages.
Singapore Search and Examination Report for Application No. 201303747-8, dated Feb. 14, 2014, 14 pages.
Singapore Search and Examination Report for Application No. 201303748-6, dated Feb. 14, 2014, 16 pages.

METHOD AND SYSTEM FOR IMPROVING COMPRESSED IMAGE CHROMA INFORMATION

CROSS REFERENCE TO RELATED APPLICATIONS

This application is a divisional of and claims priority to U.S. application Ser. No. 12/176,267, filed on Jul. 18, 2008, which is a divisional of and claims priority to U.S. application Ser. No. 09/905,039, filed on Jul. 12, 2001, the disclosure of these applications are incorporated by reference.

TECHNICAL FIELD

This invention relates to video compression, and more particularly to methods, systems, and computer programs for improving compressed image chroma information in MPEG-like video compression systems.

BACKGROUND

MPEG Background

MPEG-2 and MPEG-4 are international video compression standards defining a video syntax that provides an efficient way to represent image sequences in the form of more compact coded data. The language of the coded bits is the "syntax." For example, a few tokens can represent an entire block of samples (e.g., 64 samples for MPEG-2). Both MPEG standards also describe a decoding (reconstruction) process where the coded bits are mapped from the compact representation into an approximation of the original format of the image sequence. For example, a flag in the coded bitstream signals whether the following bits are to be preceded with a prediction algorithm prior to being decoded with a discrete cosine transform (DCT) algorithm. The algorithms comprising the decoding process are regulated by the semantics defined by these MPEG standards. This syntax can be applied to exploit common video characteristics such as spatial redundancy, temporal redundancy, uniform motion, spatial masking, etc. In effect, these MPEG standards define a programming language as well as a data format. An MPEG decoder must be able to parse and decode an incoming data stream, but so long as the data stream complies with the corresponding MPEG syntax, a wide variety of possible data structures and compression techniques can be used (although technically this deviates from the standard since the semantics are not conformant). It is also possible to carry the needed semantics within an alternative syntax.

These MPEG standards use a variety of compression methods, including intraframe and interframe methods. In most video scenes, the background remains relatively stable while action takes place in the foreground. The background may move, but a great deal of the scene is redundant. These MPEG standards start compression by creating a reference frame called an "intra" frame or "I frame". I frames are compressed without reference to other frames and thus contain an entire frame of video information. I frames provide entry points into a data bitstream for random access, but can only be moderately compressed. Typically, the data representing I frames is placed in the bitstream every 12 to 15 frames (although it is also useful in some circumstances to use much wider spacing between I frames). Thereafter, since only a small portion of the frames that fall between the reference I frames are different from the bracketing I frames, only the image differences are captured, compressed, and stored. Two types of frames are used for such differences—predicted or P frames, and bi-directional interpolated or B frames.

P frames generally are encoded with reference to a past frame (either an I frame or a previous P frame), and, in general, are used as a reference for subsequent P frames. P frames receive a fairly high amount of compression. B frames provide the highest amount of compression but require both a past and a future reference frame in order to be encoded. Bi-directional frames are never used for reference frames in standard compression technologies.

Macroblocks are regions of image pixels. For MPEG-2, a macroblock is a 16×16 pixel grouping of four 8×8 DCT blocks, together with one motion vector for P frames, and one or two motion vectors for B frames. Macroblocks within P frames may be individually encoded using either intra-frame or inter-frame (predicted) coding. Macroblocks within B frames may be individually encoded using intra-frame coding, forward predicted coding, backward predicted coding, or both forward and backward (i.e., bi-directionally interpolated) predicted coding. A slightly different but similar structure is used in MPEG-4 video coding.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed pattern (e.g., IBBPBBPBBPBBPBB).

MPEG Color Space Representation

MPEG-1, MPEG-2, and MPEG-4 all utilize a Y, U, V color space for compression. There is a choice of luminance equation, but a typical conversion transformation between RGB (red-green-blue) to a YUV representation is expressed as:

$$Y=0.59G+0.29R+0.12B$$

$$U=R-Y$$

$$V=B-Y$$

The Y luminance factors for green range from 0.55 up to 0.75, depending upon the color system. The factors for red range from 0.2 to 0.3, and the factors for blue range from 0.05 to 0.15.

This transformation can be cast as a matrix transformation, which is a linear operator intended for use on linear signals. However, this simple transformation is performed in MPEG 1, 2, and 4 in the non-linear video space, yielding various artifacts and problems.

It is typical in MPEG to reduce the resolution of the U and V chroma channels to achieve higher compression. The most commonly used reduction of resolution is to use half resolution both vertically and horizontally. MPEG-2 supports full resolution chroma, as well as half resolution horizontally. However, the most commonly used MPEG-2 profiles, Main Profile at Main Level (MP @ ML) and Main Profile at High Level (MP @ HL), use half resolution horizontally and vertically. MPEG-4 versions 1 and 2 use half resolution vertically and horizontally. Note that full chroma resolution is often called 4:4:4, half chroma horizontal resolution is often called 4:2:2, and half vertical and horizontal resolution is often called 4:2:0. (It should be noted that the 4:x:x nomenclature is flawed in its meaning and derivation, but it is common practice to use it to describe the chroma resolution relationship to luminance.)

The filter which reduces the horizontal and vertical chroma resolution under the various MPEG standards is applied to non-linear video signals as transformed into the U and V color representation. When the inverse transformation is applied to recover RGB, the non-linear signals and the filters interact in such a way as to produce artifacts and problems. These problems can be generalized as "crosstalk" between the Y luminance and the U and V chroma channels, along with spatial aliasing.

Further information on linear versus non-linear representations and transformations may be found in "The Use of Logarithmic and Density Units for Pixels" by Gary Demos, presented at the October 1990 SMPTE conference, and published in the SMPTE Journal (October 1991, vol. 100, no. 10). See also "An Example Representation for Image Color and Dynamic Range which is Scalable, Interoperable, and Extensible" by Gary Demos, presented at the October 1993 SMPTE conference and published in the proceedings and preprints, These papers describe the benefits of logarithmic and linear spaces at various stages of the image compression processing pipeline, and are hereby incorporated by reference.

Chroma Sub-Sampling

The reason for reducing chroma resolution for U and V is that the human visual system is less sensitive to changes in U and V than it is to changes in luminance, Y. Since Y is mostly green, and U and V are mostly red, and blue respectively, this can also be described as a human visual sensitivity being higher for green than for red and blue. However, although U and V are treated the same in MPEG-1, MPEG-2, and MPEG-4, the human visual system is more sensitive to U (with its red component) than to V (with its blue component).

This difference in chroma sensitivity is embodied in the 1951 NTSC-2 color standard that is used for television. NTSC-2 uses a YIQ color space, where I and Q are similar to U and V (with slightly different weightings). That is, the I channel primarily represents red minus luminance and the Q channel primarily represents blue minus luminance. In NTSC-2, the luminance is given 4.5 MHz of analog bandwidth, and the I chroma channel is given 1.5 MHz of analog bandwidth. The Q channel, representing the blue-yellow axis, is given only 0.5 MHz of analog bandwidth.

Thus, the NTSC-2 television system allocates three times as much information to the I channel than it does to the Q channel, and three times as much information to the Y luminance channel than to the I channel. Therefore, the bandwidth ratio between the Y luminance channel and the Q (blue minus luminance) channel is nine. These MPEG YUV and NTSC-2 relationships are summarized in the following table:

| Ratio | YUV 4:4:4 | YUV 4:2:2 | YUV 4:2:0 | NTSC-2 |
| --- | --- | --- | --- | --- |
| Red, U, and I pixels to Y | 1:1 | 2:1 | 4:1 | 3:1 |
| Blue, V, and Q pixels to Y | 1:1 | 2:1 | 4:1 | 9:1 |

Ratio of Chroma Resolution to Luminance

Clearly there is a greater difference in treatment between the luminance channel and the U and V channels under the MPEG standards than the luminance and I and Q channels in the NTSC-2 standard.

SUMMARY

The invention is directed to methods, systems, and computer programs for improving compressed image chroma information.

More particularly, in one aspect of the invention, a color video image may be improved by increasing the red resolution for an RGB representation (or the U resolution for a YUV representation) above the resolution used for blue (or V). Using lower resolution for the blue color component means less information needs to be compressed, such as in a motion compensated color video image compression system. This aspect of the invention includes a method, system, and computer program for compressing image chroma information of a color video image in a video image compression system by selecting a resolution for a red color component of the color video image that is higher than the resolution for a blue color component of the color video image.

Another aspect of the invention is a technique for reducing the level of chroma noise that results from any given value of the quantization parameter (QP) used during compression, thereby improving image quality. This is accomplished by utilizing a lower value of QP for the U (=R−Y) channel than for the Y channel. Similarly, the quality of the V (=B−Y) channel may also be improved by utilizing a lower QP value for the V channel than for the Y channel.

Another aspect of the invention is a technique useful when higher compression is required. In this aspect, a positive QP bias is applied to the QP value for the Y channel for use with either or both of the U and V chroma channels.

Another aspect of the invention is use of a logarithmic representation to benefit image coding. Logarithmic coding, when feasible, can improve coding efficiency for YUV color space representations of images originally represented as linear RGB pixel values. At other processing steps, a conversion to and from linear representations can be beneficial.

Another aspect of the invention is a method for improving the video characteristics of a color video image in a video compression system, including: selecting a set of image channels to represent the color video image, including a luminance channel and n chroma channels, where n is at least three; and compressing the luminance channel and the n additional chroma channels to a compressed video image.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Improved Color Coding Precision

As the quality of images improves with respect to the attributes of reduced noise, extended dynamic range, and extended color range, human sensitivity to color also increases. In particular, it has been observed that red in an RGB representation (or U in a YUV representation) often requires higher precision and clarity than is commonly used in video compression.

Unless blue is being used for processing (such as blue-screen special effects compositing or image analysis), human sensitivity to the blue-yellow chroma axis, as embodied by either blue or V, is adequately addressed by half resolution sampling horizontally and vertically. Thus, one quarter of the total number of pixels of an image provides sufficient quality for representing the blue or V chroma axis. However, unlike blue and V, one-half resolution coding of red and/or U is sometimes insufficient in quality with respect to large wide-dynamic range displays and projectors.

Thus, an image may be improved by increasing the red resolution for an RGB representation (or the U resolution for a YUV representation) above the resolution used for blue (or V). Using lower resolution for the blue color component means less information needs to be compressed, such as in a motion compensated color video image compression system.

In accordance with the invention, there are three preferred methods of maintaining increased red (or U) resolution with respect to a downfiltered blue (or V) resolution:

1) Use full resolution for red and/or U;
2) Use one-half resolution on only one chroma axis, either vertically or horizontally, for red and/or U; or
3) Use a filtered resolution between full size and one-half, such as ⅔ or ¾, on one or both chroma axes for red and/or U.

Figure 1:
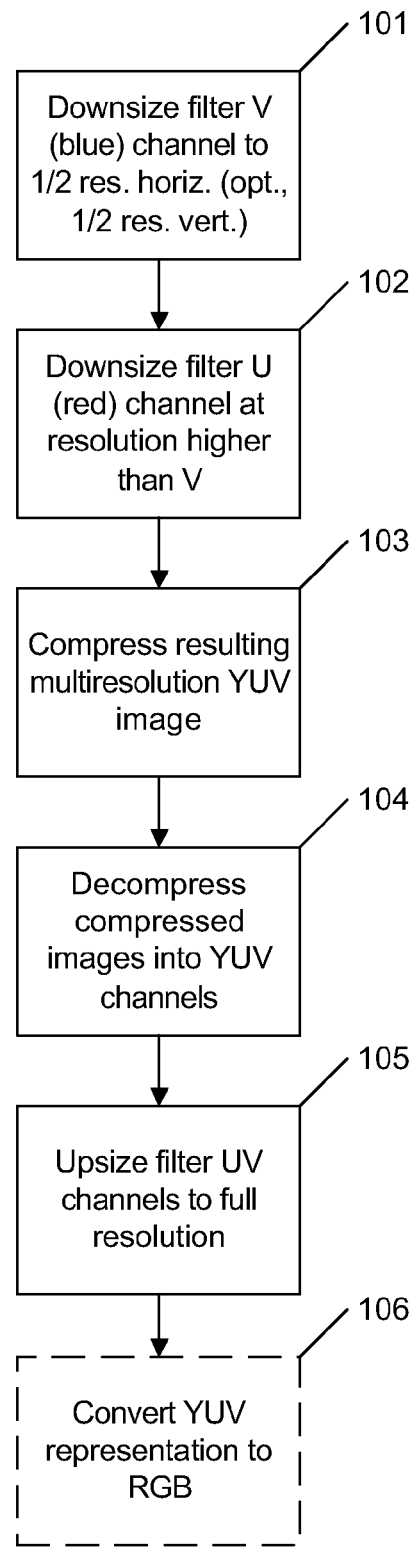
FIG. 1 is a flowchart showing an illustrative method (which may be computer implemented) for increasing the resolution for U above the resolution used for V in a YUV color space representation.

FIG. 1 is a flowchart showing an illustrative method (which may be computer implemented) utilizing higher resolution for U than the resolution used for V in a YUV color space representation (a similar method may be applied to an RGB color space representation):

Step 101: In an image compression system utilizing a YUV color space representation, downsize filter the V (=B−Y) channel of an input image to one-half resolution horizontally, and optionally to one-half resolution vertically.

Step 102: Downsize filter the U (=R−Y) channel of the image to a resolution higher than the V (=B−Y) channel, preferably being one of:
  a) full resolution;
  b) between one-half and full resolution horizontally, but full resolution vertically;
  c) between one-half and full resolution horizontally and vertically;
  d) between one-half and full resolution vertically, but full resolution horizontally.

Step 103: Compress the YUV image (having luminance Y and the downsize filtered U and V chroma information) using an MPEG-like compression system.

Step 104: Decompress the images into Y, U, and V channels (usually in a different computer).

Step 105: Convert the U and V channels to full resolution, using the appropriate resolution increase (i.e., the reciprocal of the downsize filter factor used in Step 101 above for V and Step 102 above for U).

Step 106: Optionally, convert the YUV picture to an RGB image for viewing, analysis, or further processing.

Differential QP Bias for Chroma

Co-pending U.S. patent application Ser. No. 09/798,346, entitled "High Precision Encoding and Decoding of Video Images" and assigned to the assignee of the present invention (which is hereby incorporated by reference), teaches various aspects of the use of the quantization parameter (QP) during compression. Another aspect of the present invention is a technique for reducing the level of chroma noise that results from any given value of the quantization parameter (QP) used during compression, thereby improving image quality. This is accomplished by utilizing a lower value of QP for the U (=R−Y) channel than for the Y channel. Similarly, the quality of V (=B−Y) may also be improved by utilizing a lower QP value for the V channel than for the Y channel.

A simple method of implementing a reduced chroma QP value is to subtract a constant value from the QP value used for the Y (luminance) channel. Alternatively, a separate constant value (lower than the QP value for Y) might be used for each of U and V. For example, "2" might be subtracted from the QP value for Y to yield the QP value for U, and "1" might be subtracted for the QP value for Y to yield the QP value for V. Any useful value of the amount to subtract can be used, limited only by a minimum value of "1" for the applied QP value.

This method works for constant QP values (variable bit rate). It also works as well for variable QP values (e.g., in both constant and variable bit rate motion compensated compression systems), since the instantaneous QP value can be biased by subtracting a specified difference value from the QP value for Y to yield a QP value for each of U and V.

Further, the range of these differential chroma-biased QP values can be extended using the extended QP range function or lookup, as described in the "High Precision Encoding and Decoding of Video Images" patent application referenced above.

It is necessary to signal the U and V bias values from the encoder to the decoder unless a pre-arranged value is used. These can be specified once, for example, for each session, group of pictures (GOP), frame, or image region.

Figure 2:
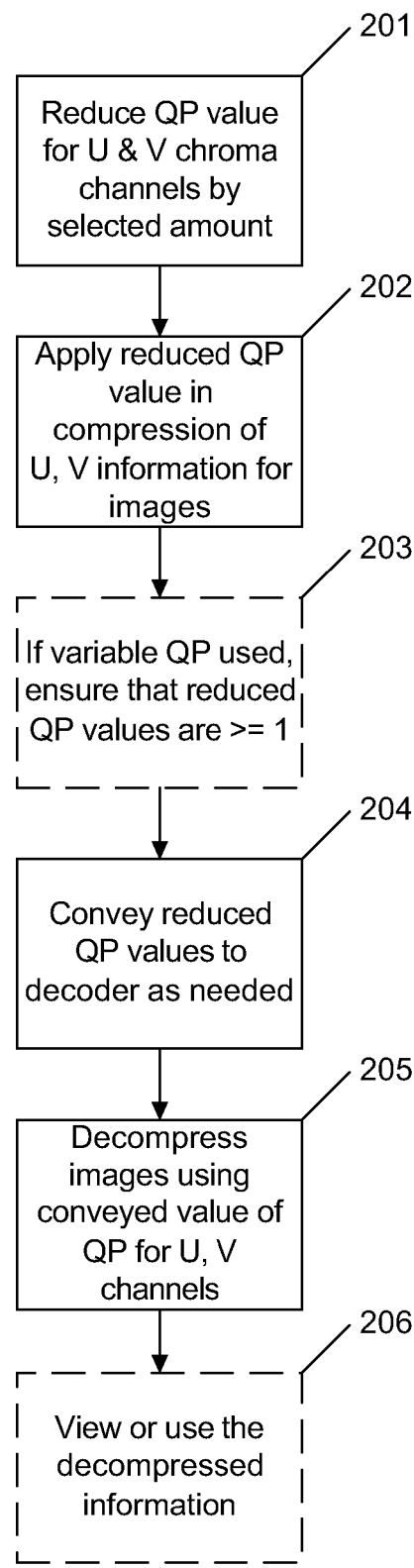
FIG. 2 is a flowchart showing an illustrative method (which may be computer implemented) for applying a QP bias for chroma channels.

FIG. 2 is a flowchart showing an illustrative method (which may be computer implemented) for applying a QP bias for chroma channels:

Step 201: In an image compression system, reduce the QP value for each of the U and V chroma channels by a selected value (which may be different for each channel).

Step 202: Utilize this reduced QP value for the U and V chroma channel compressions, respectively.

Step 203: Optionally, if variable QP values are used, ensure that the reduced U and V QP value is at least "1".

Step 204: Unless a pre-set bias is to be used, signal or convey the QP value reduction amount to the decoder as often as it may change (once at a minimum).

Step 205: Decompress (usually in a different computer) the signal using the appropriate QP value for U and V (again ensuring that the reduced QP value is at least "1").

Step 206: Optionally, view the decompressed images, or use the images for additional processing or analysis.

Another aspect of the invention is a technique useful when higher compression is required. In this aspect, a positive QP bias is applied to the QP value for the Y channel for use with either or both of the U and V chroma channels (preferably checking against a QP maximum value of a compression system, if any). Separate bias can be used for each of the U and V channels. Otherwise, the steps of such an embodiment would be similar to those shown in FIG. 2.

Logarithmic Coding of Luminance and Chroma

The paper entitled "The Use of Logarithmic and Density Units for Pixels," referenced above, describes the benefits of a logarithmic representation for dynamic range. Log representations of a matching dynamic range are somewhat similar to commonly used video transfer functions. Even though similar, the logarithmic representation is more optimal in extensibility, calibration usage, and in orthogonality of color channels than are the various commonly used video representations.

Another aspect of the invention is use of a logarithmic representation to benefit image coding. It has been discovered that logarithmic coding, when feasible, can improve coding efficiency for YUV color space representations of images originally represented as linear RGB pixel values (such as at the sensor of a camera). At other processing steps, a conversion to and from linear representations can be beneficial.

As described in the "High Precision Encoding and Decoding of Video Images" patent application referenced above, chroma crosstalk with luminance is minimized when:

$$Y \log = \text{Log}(Wr^*R + Wg^*G + Wb^*B)$$

$$U = \text{Log}(R) - Y \log$$

$$V = \text{Log}(B) - Y \log$$

where Wr, Wg, and Wb are the linear weightings for the red, green, and blue components of luminance, and where R, G, and B represent a linear light space. These relationships are useful in applying this aspect of the invention.

Figure 3:
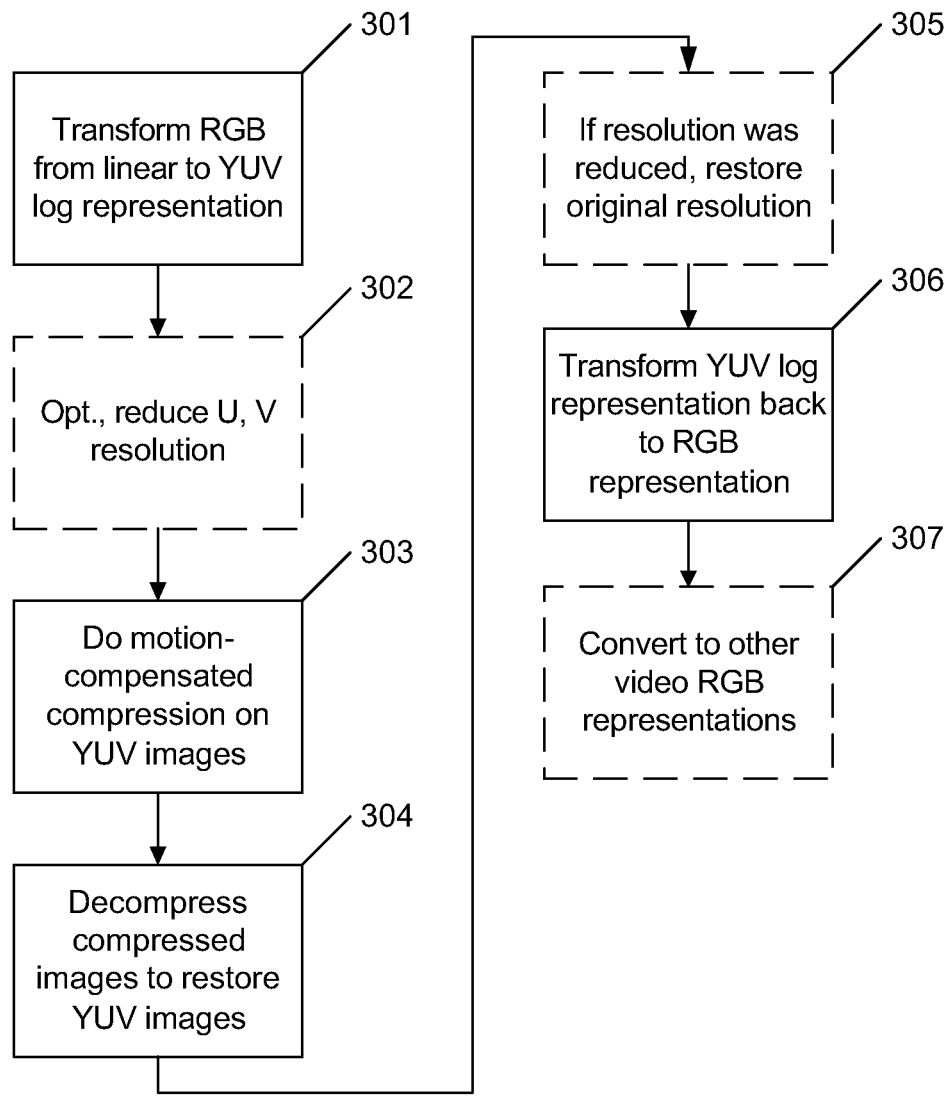
FIG. 3 is a flowchart showing an illustrative method (which may be computer implemented) for logarithmic coding of luminance and chroma information.

FIG. 3 is a flowchart showing an illustrative method (which may be computer implemented) for logarithmic coding of luminance and chroma information:

Step 301: In an image compression system, perform the following transformation on input (e.g., directly from a video camera) linear R, G, and B pixel values:

$$Y \log = \text{Log}(Wr^*R + Wg^*G + Wb^*B)$$

$$U = \text{Log}(R) - Y \log$$

$$V = \text{Log}(B) - Y \log$$

where Wr, Wg, and Wb are the linear weightings for the red, green, and blue components of luminance.

Step 302: Optionally, reduce the resolution of the U and V chroma channels (as described above).

Step 303: Perform motion-compensated compression on this Y, U, and V representation of the moving image.

Step 304: Decompress the compressed images to restore Y, U, and V color components of the moving image (usually in a different computer).

Step 305: If optional Step 302 was applied, reverse the resolution reduction to restore full U and V resolution.

Step 306: Restore the linear R, G, and B pixel values using the following transformation:

$$R = \text{anti-log}(Y+U)$$

$$B = \text{anti-log}(Y+V)$$

$$G = (\text{anti-log}(Y) - Wr^*R - Wb^*B)/Wg$$

Step 307: Optionally, convert to other video RGB representations (alternatively, may be done in lieu of Step 306 rather than in addition to Step 306).

Additional Chroma Axes

In extended dynamic range and extended contrast range images, it may be beneficial to augment visible wavelength channels with additional channels of image information, both visible and non-visible.

The range of colors available from any given set of red, green, and blue primaries does not include all possible visible colors. The combining of proportions of red, green, and blue primary colors to create other visible colors such as yellow, orange, cyan, and brown, is a property of the human visual system known as the "metamerism".

As pointed out in the paper entitled "An Example Representation for Image Color and Dynamic Range which is Scalable, Interoperable, and Extensible", referenced above, it is possible to add additional color primaries to the three primaries of red, green, and blue. In particular, cyan, magenta, and yellow color primaries help to extend the color gamut beyond the range available from most common red, green, and blue primary values. Further, violet and ultraviolet (which brightens phosphorescent colors) can also be conveyed.

Beyond the visible colors, invisible infrared wavelengths have proven useful in penetrating clouds and haze, and in seeing in the dark. Ultraviolet wavelengths can also be useful for seeing low-amplitude visible image details, such as fingerprints and surface coatings.

Further, even in the visible wavelengths, various materials (e.g., smog and underwater algae) often reduce the amount of contrast or dynamic range of some wavelengths. This is why smog can appear brown, giving a brown tint to all objects in the distance, having reduced the blue contrast and dynamic range. This is also why underwater photography can appear green, blue-green, or blue, since the red end of the visible spectrum is reduced in contrast and dynamic range.

The logarithmic relationships between Y, U, and V, as described above, will optimize the coding of color relationships for visible light.

In this aspect of the invention, additional chroma channels are added to the channels encoding three primary wavelengths, typically embodied by RGB or YUV representations. Further, when using a YUV color space, it is also possible to change the makeup of the Y (luminance) channel to favor the highest amplitude image signals. Thus, for example, the green visible channel might be coded using its own chroma channel, with luminance moving to other wavelength regions. This concept can be extended to where Y luminance is infrared, with red, green, and blue (and perhaps other visible and non-visible primaries) each having their own chroma channels.

In accordance with this aspect of the invention, for each new chroma channel, the following should be determined:
1) Should the channel be coded differentially from one or more other channels (usually from luminance, such as $U=R-Y$)?
2) Should the channel be given full resolution with respect to luminance, or can resolution be reduced without impairing the image quality for a given intended usage?

The determination in 1) is based upon the correlation of each coded channel with other channels. For example, ultraviolet or far-infrared wavelength images may be relatively uncorrelated to visible wavelengths, or to each other. In such a case, these channels might be coded without reference to other channels. However, any visible wavelengths are highly correlated, and thus can almost always benefit from being coded with respect to each other.

Based upon these determinations, a set of image channels can be selected, usually exceeding (or replacing and exceeding) the three primary channels (e.g., YUV). For example, the set of selected image channels may comprise a Y' luminance channel, and n chroma channels, such as a U' first chroma channel, a V' second chroma channel, and an X' third chroma channel.

Using this example, and applying motion compensated compression, the selected value of Y' would be coded with full resolution, and the various other chroma channels (U', V', X') would be differentially or independently coded. All channels can utilize the same motion vector and macroblock motion compensation structure as would be used for conventional YUV representations, except that there would be additional channels. Each such channel would utilize an appropriate resolution with respect to Y (as determined in step 2 above). In addition, a QP bias (as described above) can be independently applied to each chroma channel, to ensure that the desired compression chroma quality is achieved.

Even when applied only to visible wavelengths, additional chroma channels can ensure not only extended color range and more accurate color, but also allow additional clarity, detail, and noise fidelity to be applied to such highly visible colors as magenta, orange, yellow, and aqua-cyan. These benefits can be particularly significant for wide-dynamic range and wide-contrast range images.

Figure 4:
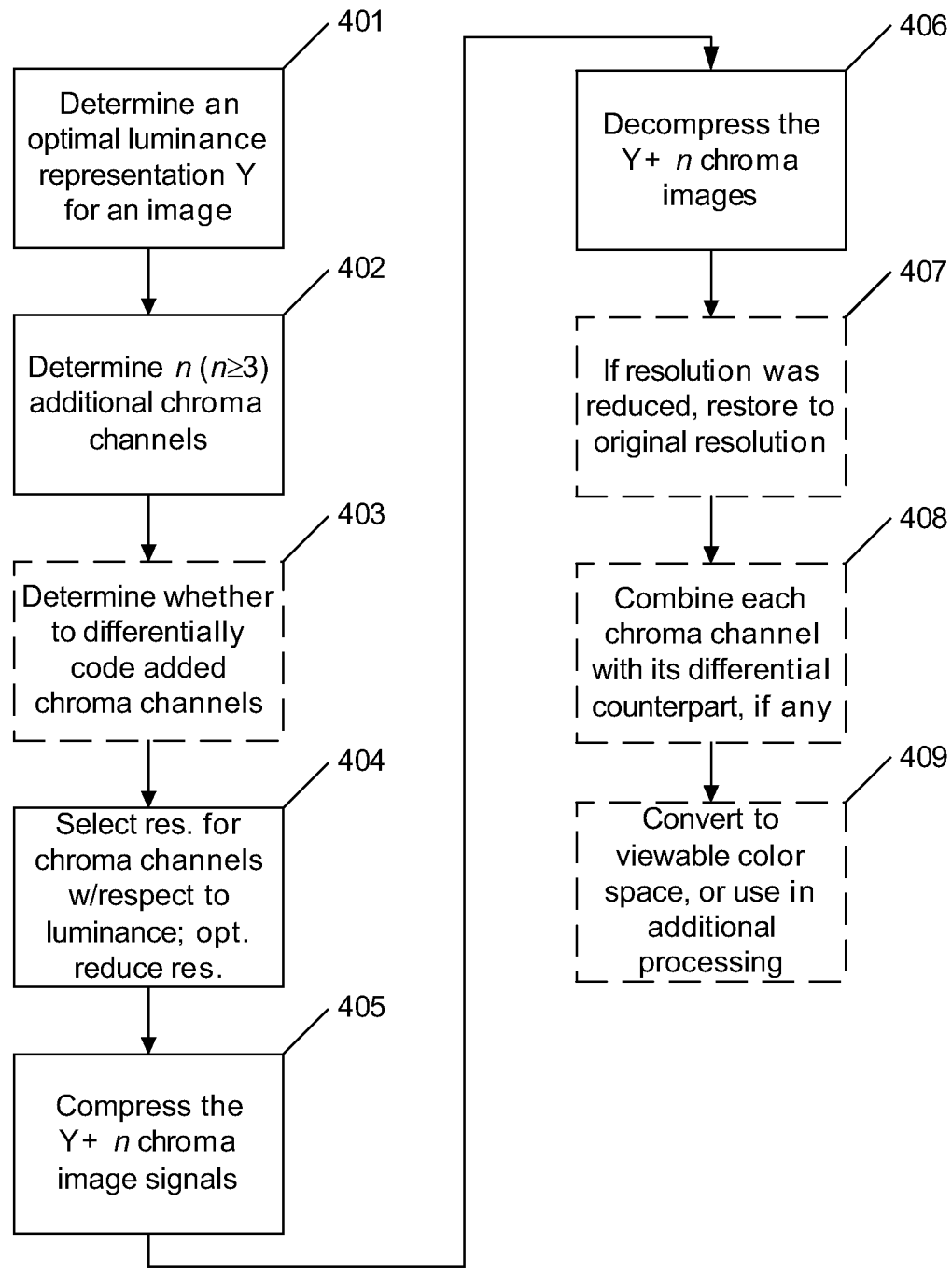
FIG. 4 is a flowchart showing an illustrative method (which may be computer implemented) for coding additional chroma channels in an image compression system.

FIG. 4 is a flowchart showing an illustrative method (which may be computer implemented) for coding additional chroma channels in an image compression system:

Step 401: In an image compression system, determine an optimal luminance representation for an image, selected based upon widest dynamic range and highest resolution, including optional non-visible wavelength image signals.

Step 402: Determine n additional chroma channels to represent the image, where n is at least three.

Step 403: Optionally, for each chroma channel, determine whether it is beneficial to code differentially with respect to luminance and/or one or more other chroma channels.

Step 404: Determine the resolution desired for each chroma channel image signal from an input with respect to the luminance image signal, such resolution being equal to or less than the resolution of the luminance, and optionally apply a resolution reduction.

Step 405: Compress the Y+n chroma image signals using motion compensated compression.

Step 406: Decompress the Y+n chroma images (usually in a different computer).

Step 407: If resolution reduction was applied, restore the original resolutions of the chroma channels.

Step 408: Combine each chroma channel with its differential counterpart, if any, from Step 403 above.

Step 409: Optionally, perform any of the following:

a) Convert the chroma channels to a viewing space, such as RGB, or to spaces having more than three primaries, and view as a true-color image;

b) Perform the conversion of a) but view as a false-color image (such as mapping infrared to green);

c) Use the chroma channels without conversion for processing and/or analysis.

As another option, each chroma channel may have a biased QP value applied (either increasing or decreasing), relative to the QP value used for the luminance channel, to achieve a desired level of quality for each chroma channel (i.e., trading off chroma noise versus higher degree of compression).

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A computer-implemented method for a decoder, the computer-implemented method comprising:

receiving, at the decoder, at least a luminance QP (quantization parameter) value and a first chroma QP bias value for a bi-directionally interpolated macroblock, wherein the first chroma QP bias value was determined at an encoder and signaled from the encoder to the decoder, wherein the decoder comprises a luminance channel, a first chroma channel and a second chroma channel, and wherein the encoder comprises a chroma channel having one-half of a horizontal resolution of the luminance channel of the decoder;

utilizing, with the decoder, the luminance QP value and the first chroma QP bias value to determine a first chroma QP value for the bi-directionally interpolated macroblock by adding the first chroma QP bias value to the luminance QP value; and decompressing an image region of a video image using the luminance QP value and the determined first chroma QP value, wherein the determined first chroma QP value is less than a predetermined maximum value and greater than a predetermined minimum value, and wherein the determined first chroma QP value is determined for the first chroma channel.

2. The computer-implemented method of claim 1, further comprising:

receiving, at the decoder, a second chroma QP bias value;

utilizing, with the decoder, the luminance QP value and the second chroma QP bias value to determine a second chroma QP value by adding the second chroma QP bias value to the luminance QP value; and decompressing the image region of the video image using at least the second chroma QP value, wherein the second chroma QP value is determined for the second chroma channel, and wherein the first chroma QP bias value used to determine the first chroma QP value for the first chroma channel differs from the second chroma QP bias value used to determine the second chroma QP value for the second chroma channel.

3. The computer-implemented method of claim 2, further comprising configuring the first chroma QP bias value to be greater than zero or less than zero, and configuring the second chroma QP bias value to be greater than zero or less than zero.

4. The computer-implemented method of claim 1, further comprising configuring the QP bias value to be greater than zero or less than zero.

5. The computer-implemented method of claim 1, wherein the image region is inter-frame predicted.

6. The computer-implemented method of claim 1, further comprising:

utilizing, with the decoder, a range of differential chroma-biased QP values, wherein the range of the differential chroma-biased QP values comprises the QP bias value; and extending the range of the differential chroma-biased QP values with an extended QP range function or a lookup table comprising the differential chroma-biased QP values.

7. A computer-implemented method for a decoder, the computer-implemented method comprising:

receiving, at the decoder, at least a luminance QP (quantization parameter) value and a first chroma QP bias value for a bi-directionally interpolated macroblock, wherein the first chroma QP bias value was determined at an encoder and signaled from the encoder to the decoder, and wherein the decoder comprises a luminance channel, a first chroma channel and a second chroma channel;

utilizing, with the decoder, the luminance QP value and the first chroma QP bias value to determine a first chroma QP value for the bi-directionally interpolated macroblock by adding the first chroma QP bias value to the luminance QP value; and decompressing an image region of a video image using the luminance QP value and the determined first chroma QP value, wherein the determined first chroma QP value is less than a predetermined maximum value and greater than a predetermined minimum value, and wherein the determined first chroma QP value is determined for the first chroma channel.

\* \* \* \* \*